United States Patent [19]

Berndt

[11] Patent Number: 4,820,057

[45] Date of Patent: Apr. 11, 1989

[54] METHOD AND APPARATUS TO CONTACTLESSLY MEASURE THE BRAKE TEMPERATURES OF PASSING RAILROAD CARS

[75] Inventor: Dietmar Berndt, Koblenz, Fed. Rep. of Germany

[73] Assignee: Signaltechnik GmbH, Koblenz, Fed. Rep. of Germany

[21] Appl. No.: 109,931

[22] Filed: Oct. 16, 1987

[30] Foreign Application Priority Data

Oct. 28, 1986 [EP] European Pat. Off. ...... 86/114939.1

[51] Int. Cl.$^4$ .................................................. G01J 5/10
[52] U.S. Cl. .................................... 374/141; 246/246; 374/121
[58] Field of Search ............... 374/121, 129, 103, 141; 377/25

[56] References Cited

U.S. PATENT DOCUMENTS

| | | | |
|---|---|---|---|
| 3,151,827 | 10/1964 | Gallagher et al. | 324/239 X |
| 3,303,340 | 2/1967 | Hewett et al. | 356/43 X |
| 3,461,284 | 8/1969 | Joy | 374/132 X |
| 3,998,549 | 12/1976 | Pusch et al. | 374/129 |
| 4,090,064 | 5/1978 | Turner | 377/25 |

FOREIGN PATENT DOCUMENTS 1197300  11/1985  Canada .

Primary Examiner—Daniel M. Yasich
Attorney, Agent, or Firm—Gilbert L. Wells

[57] ABSTRACT

A method is described to contactlessly measure the brake temperatures of passing railroad cars, whereby the temperatures of all current practical brake types, for instance shoe and disk brakes at the wheels, but also of separate brake disks, can be measured. The method is characterized by using a known measurement apparatus with optics followed by an infrared sensor, whereby the measurement axis of this apparatus scans the passing wheel at a height 1 to 5 cm above the rail surface, the measurement axis "looking" from the rear-bottom, namely at an anagle alpha to the horizontal of 10° to 22° and at an angle omega of 7° to 18° to a horizontal line which is perpendicular to the rails, on the wheel. The measurement apparatus is controlled by track switch means activating the apparatus as long as the wheel rolls through the measurement axis. An electronic circuit is provided to extend the active time of the measurement apparatus by a factor N wherein the measurement axis measures the separate brake disk in railroad cars so equipped.

2 Claims, 3 Drawing Sheets

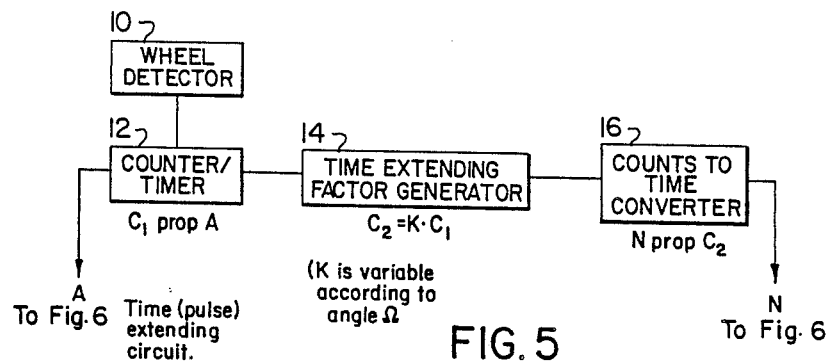
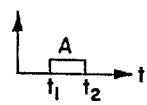 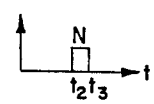
FIG.5a    FIG.5b
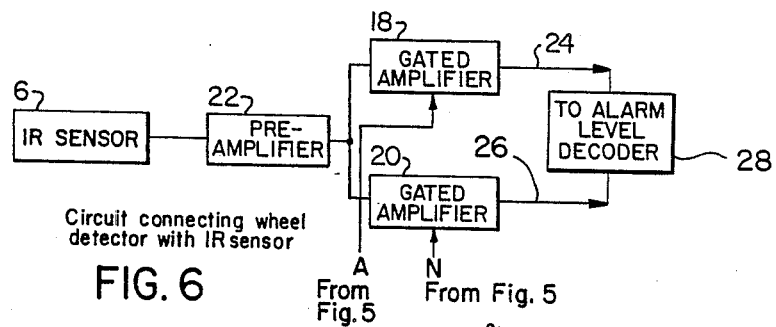
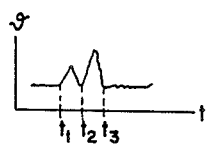
FIG.6a
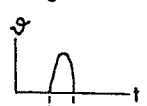
FIG.6b
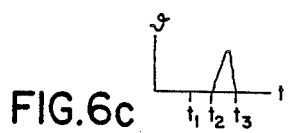
FIG.6c

_4,820,057_

METHOD AND APPARATUS TO CONTACTLESSLY MEASURE THE BRAKE TEMPERATURES OF PASSING RAILROAD CARS

BACKGROUND OF THE INVENTION

The field of the invention is optics, measuring and testing with optical pyrometers and the invention is particularly concerned with a method and apparatus to contactlessly measure the brake temperature of passing railroad cars.

The state of the art of measuring the temperature of the running gear of railway cars may be ascertained by reference to U.S. Pat. No. 3,998,549 and Canadian Patent No. 1,197,300 the disclosures of which are incorporated herein by reference.

U.S. Pat. No. 3,998,549 and the references disclosed therein disclose how to measure the temperature of the brakes or of the wheel flanges of passing railroad cars by detecting the infrared (IR) heat rays emitted by the brakes.

It is further known from U.S. Pat. No. 3,151,827 to mount switch means on tracks which when passed by a wheel shall emit a gating pulse whereby the measuring system is activated and deactivated when a wheel enters and leaves the measuring zone. Such measuring systems consist in known manner of an optics followed by an IR sensor jointly defining a measuring axis.

In the past the railroad car brakes all were of approximately the same design, namely shoe brakes, and therefore it was possible to measure all brakes or wheel flanges with a single type of measuring system.

In the course of time however the most diverse brake systems and geometries have been developed, so that presently it is no longer practically possible to reliably detect all brake geometries possibly present in a train by means of a single measuring system specifically associated with a given wheel. Illustratively such diverse brake systems can be: the conventional shoe brakes wherein the shoes act on the periphery of the wheel tread, further outer or inner disk brakes wherein the wheel itself is the disk, and lastly high-performance inner disk brakes, wherein one or more separate disks are fixed between the wheels on the axle.

Furthermore, railroad car wheels assume the most diverse diameters and axle spacings.

SUMMARY OF THE INVENTION

Having in mind the limitations of the prior art it is an objective of the present invention to create a measurement method and measuring apparatus whereby, in the presence of all these diverse brake systems and geometries and regardless of wheel diameter and axle spacing, a single measurement method and a single apparatus shall suffice to reliably detect the particular brake temperature and whereby the measured temperature can be specifically associated to the particular measured wheel.

According to the present invention, this object is achieved by a measurement method and measuring apparatus comprising an optics followed by an infrared sensor feeding infrared rays emitted from a brake or wheel to the infrared sensor along a measurement axis defined by the sensor and the optics.

The measurement axis (7) is directed toward the passing wheels (3a, 3b) so that it is incident on the wheel flange (3a) at a height (H) from about 1 to 5 cm above the top of the rail,
- the measurement axis (7) subtends a height angle alpha of about 10° to 20° with the plane of the two upper rail edges, and
- the measurement axis (7) subtends a side angle omega of about 7°–18° with a line perpendicularly intersecting both rails (1a, 1b).

Track switch means are provided to activate the measurement apparatus the moment the wheel has entered the measurement axis by a defined segment, these means emitting a signal when the wheel leaves the range of the track switch means, and
- an electronic circuit is provided to extend the active time of the measurement apparatus by a factor N after the wheel has left the range of the track switch means.

Accordingly, the object is achieved by the method wherein:
(a) the measurement axis is directed at the stated angles at the wheels rolling by, and
(b) the procedure of electronic extension of the active measurement time is applied.

All current brake types can be detected and differentiated by means of this method and the corresponding measurement system.

By measuring the wheel at a height of 1 to 5 cm above the rail's top, the wheel flange temperature is detected, both for wheels equipped with conventional brake shoes and with the commercially more recent brake disks wherein the wheel itself is the disk or the disk is mounted outside the wheel.

When, however, a special disk is mounted as a brake disk on the axle between the wheels, then on account of the special and specified angular direction of the measurement axis it is possible also to measure this brake disk. This is made possible because the measuring axis slanting upward toward the wheels and intersecting the wheel flange at the stated height of 1 to 5 cm scans the more rearward brake disk approximately at a midway height when the wheel itself already has passed the measurement axis. Accordingly in the combination of the stated side angle omega of 7–18 degrees with the height angle alpha of 10 to 22 degrees, the detector "looks" along the measurement axis from rear-bottom onto the brake disk and can sense its temperature as long as the brake disk is moving through the measurement axis.

During that time interval the wheel proper already has left the switch means zone, whereby the measurement apparatus already should be deactivated. In the present invention however the active time of the measurement apparatus is extended by an electronic circuit by a time interval which is a certain percentage of that time length in which the measurement apparatus was activated by the wheel moving over the track switch means. In other words, the active time of the measurement is electronically extended by a factor N with respect to the time that was actually switched on. Thereby it also becomes possible to ascertain whether the temperature is that of the wheel flange and hence from brake shoes or from disk brakes acting on the wheel itself, or whether the temperature is due to a specific brake disk between the wheels also braked by shoes. If for instance the temperature pulse occurs during the actual switching time of the rail switch means (=direct activation time of the measurement apparatus), then the pulse clearly is caused by the wheel flange; if on the other hand the pulse only occurs within the electronically extended active time, then it is clear per se that it is due to the special brake disk between the wheels.

For bi-directional traffic, a second track switch means —offset by an angle omega—must be mounted on the opposite rail of the same track or on the same rail as the first track switch means but projected vertically in the plane. When a train arrives from this second direction, the additional track switch means, that is the gating pulse it generates, alone determines the temperature analysis of the brake disks between the wheels. Only after the field of view of this additional track switch means has been crossed does the wheel come into the range of the first track switch means which also counts axles and simultaneously reactivates the measurement apparatus for the wheel temperature analysis (shoe brakes or wheel-disk brakes). Because the direction of an incoming train can be determined by further, more external track switch means, the time when a particular track switch means shall activate the measurement apparatus for analysis is selectable. This can be implemented by suitable electronic switching. Thereby it is possible to unequivocally associate all occurring brake temperature pulses regardless of the generating brake with a specific axle, always being counted from the beginning to the end of the train.

BRIEF DESCRIPTION OF THE DRAWINGS

An illustrative embodiment of the present invention is shown in the drawings wherein;

FIG. 5 is a circuit diagram showing an electronic circuit generating time measurements A and N;

FIG. 5a is a graphical representation showing the time $t_1$ to $t_2$ for time measurement A;

FIG. 5b is a graphical representation showing the time $t_2$ to $t_3$ for time measurement N;

FIG. 6 is a circuit diagram showing the interaction of the wheel detector and the IR sensor;

FIG. 6a is a graphical representation showing the temperature signals theta generated by IR - Sensor during the time periods $t_1$ to $t_2$ (A) and $t_2$ to $t_3$ (N);

FIG. 6b is a graphical representation showing the temperature signal theta for the time measurement A; and FIG. 6c is a graphical representation showing the temperature signal theta for the time measurement N.

DESCRIPTION OF THE PREFERRED EMBODIMENTS

Figure 1:
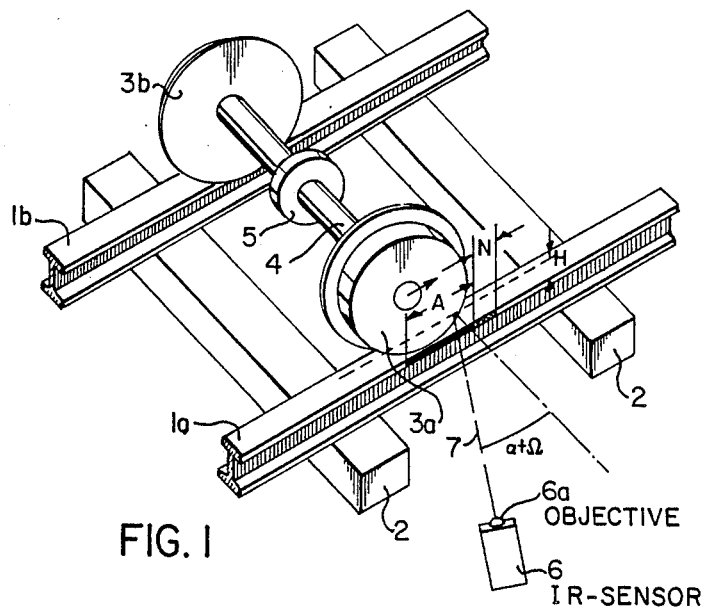
FIG. 1 is a schematic of the apparatus for implementing the method, showing a pair of wheels entering the track switch means.

FIGS. 1 to 4 show the rails 1a, 1b of a railroad track, mounted in known manner on ties 2.

A pair of wheels 3a, 3b of a railroad car not shown further rolls on the rails. The wheels 3a, 3b are rigidly joined by an axle 4 to which is fixed a brake disk 5 between the wheels.

The pair of wheels 3a, 3b is provided with braking means that may be either brake shoes that can be pressed against the tread of these wheels or of brake shoes that in the manner of disk brakes are laterally forced against the sides of the wheels, or lastly the brake means also may be brake shoes forced sideways against a special brake disk, namely the already cited brake disk 5. The last cited kind of braking is technically the most effective. For the sake of simplicity, the brake shoes are omitted from the Figures of the drawings. They are according to the state of the art.

The measurement apparatus is designated by 6 in the drawings. As in U.S. Pat. No. 3,998,549 this apparatus is mounted in fixed manner next to the track and consists of an objective 6a followed by an IR sensor upon which are incident heat rays from the wheel 3a or the brake disk 5 fed to it along a measurement axis 7 defined by the sensor and the objective.

Switch means such as disclosed in U.S. Pat. No. 3,151,827 are mounted next to the track which upon passage of the pair of wheels 3a, 3b activate the measurement apparatus. In other words, a measurement of brake temperature takes place only during the active time of the measurement apparatus. Again for the sake of simplicity, the track switch means are omitted from FIGS. 1 and 2. However, their effective range is schematically shown and indicated in both Figures by A. The measurement apparatus is (initially) activated within this range for temperature measurement.

Now the measurement apparatus 6 together with its measurement axis 7 is installed not in arbitrary manner next to the track, but according to the invention in such a way that:

(a) the measurement axis 7 intersects the wheel 3a at a height H=1 to 5 cm above the top of the rail;

(b) the measurement axis 7 subtends an angle omega of 7° to 18° with the horizontal perpendicular to the rails; and (c) the measurement axis 7 slants downward by an angle alpha of 10° to 22° relative to the horizontal.

Figure 3:
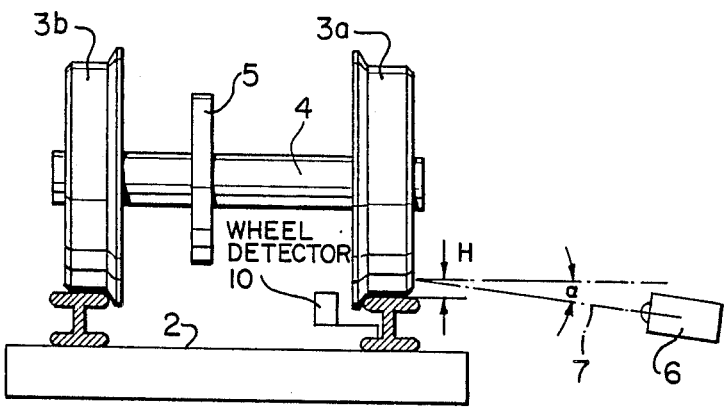
FIG. 3 is a horizontal front view of the set of wheels in the direction of travel.
Figure 4:
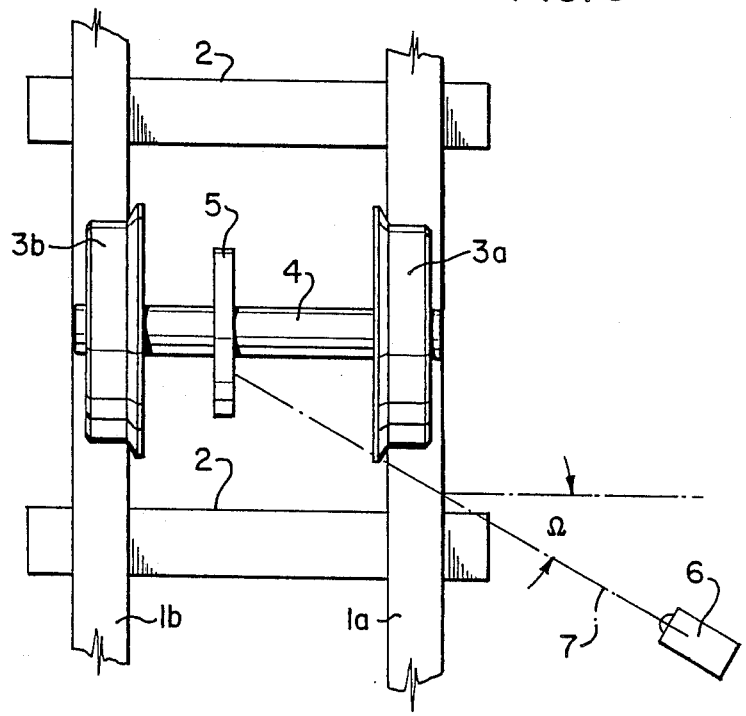
FIG. 4 is a top view of the pair of wheels.

When the measurement apparatus is mounted at these angles, it will sight by its axis 7 at a near-slant from rear-bottom onto the passing wheel 3a. In FIG. 1 these two angles are combined into an angle omega+alpha and are shown as such in that perspective. The height angle alpha is shown in FIG. 3 the way it directly deviates from the horizontal and in FIG. 4 the side angle omega is shown in relation to a perpendicular to the rail 1a.

As shown in FIG. 5 the wheel detector 10 activates a counter/times 12 which generates the range of time measurement A and activates the time extending factor generator 14.

Counter/times 12 produces signals $C_1$ which is proportional to A. Time extending factor generator 14 produces a signal $C_2$ which is proportional to N. The time extending factor generator is adjustable and variable and $C_2$ is equal to K times $C_1$. K is variable according to angle omega.

Signal $E_2$ is connected to counts-to-time converter 16 which generates factor N.

FIG. 6 shows that range of time measurement A from FIG. 5 is fed to gated amplifier 18 and factor N is fed from FIG. 5 to gated amplifier 20. Both gated amplifiers are connected to preliminary amplifier 22 which in turn is connected to IR sensor 6.

Signals from IR-Sensor 6 are fed through gated amplifier 18 to circuit 24 for the time period A and the signals from IR-Sensor 6 are fed through gated amplifier 20 to circuit 26 for the time period N.

Circuits 26 and 24 are connected to an alarm level decoder 28 which is activated when the temperature signal theta for A or N goes above a critical limit.

BEST MODE OF CARRYING OUT THE INVENTION

The measurement method of the invention using the shown measurement apparatus takes place as follows:

FIG. 1 shows the instant at which the wheel 3a has moved close enough to the track switch means that the latter activates the measurement apparatus (=start of segment A). This is the same instant in which the measurement axis 7 is first incident on the flange of the wheel 3a, so that the temperature measurement now begins.

As shown, the measurement of the temperature does not - take place at the shoe brake proper but at the so-called wheel flange, and only there after the wheel flange has moved through the measurement axis 7 by a slight amount not shown herein. This is so because both shoe and disk brakes generate sparks when pressed against the wheel and thereby may introduce spurious higher temperatures than are actually present at the brake or flange.

Henceforth the temperature is continuously measured in pulses; that is, the heat rays emitted by the wheel are chopped before being incident on the IR sensor.

Per se the measurement would take place until the wheel 3a would exit the segment A and simultaneously the measurement axis 7 would slip off the wheel flange, as thereby the active time determined by the track switch means then would be terminated.

However the measurement apparatus of the present invention is also equipped with an electronic circuit that extends electronically the active time of the measurement apparatus by a factor N. The measurement apparatus is active within that time, however not by the track switch means, but instead on account of the electronics, i.e. quasi artificially.

Figure 2:
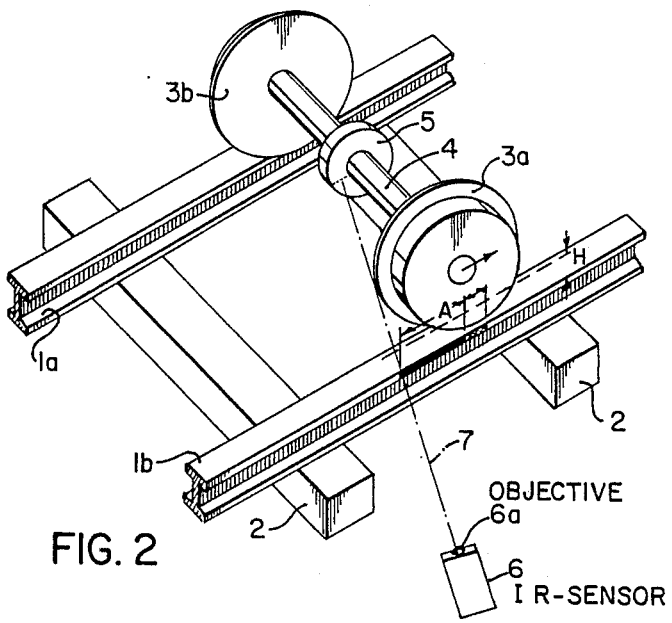
FIG. 2 is the apparatus of FIG. 1 when the pair of wheels leaves the track switch means.

As shown by FIG. 2, the measurement axis 7 jumps during this extension phase N from the wheel flange over to the brake disk 5. Accordingly it is the temperature of this brake disk 5 which is measured during the extension phase N.

Therefore the method of the invention and the corresponding apparatus plus the electronic accessory allow reliable measurement of the temperature of all current practical brake systems, further making it possible to determine whether the temperature was measured at the brakes acting on the wheel proper (shoe and disk brakes) or at a separate brake disk 5. If for instance the temperature peak value is obtained during the active time determined by the track switch means, then this peak value manifestly comes from the wheel itself as shown in FIG. 6b but if this peak value occurs during the extension time N, then it clearly comes from the separate disk brake as shown in FIG. 6c.

I claim:

1. A method for contactlessly measuring the brake temperature of railroad cars comprising an objective followed by an infrared sensor feeding infrared rays emitted from a brake or wheel to said infrared sensor along a measurement axis defined by said sensor and said objective, wherein:
   (a) said measurement axis (7) is directed toward passing wheels, (3a, 3b) of rail cars so that it is incident on a wheel flange (3a) at a height (H) from 1 to 5 cm above the top of rails on which said rails ride;
   (b) said measurement axis (7) subtends a height angle alpha of 10° to 20° with a plane of two upper edges of said rails;
   (c) said measurement axis (7) subtends a side angle omega of 7° to 18° with a plane of two upper edges of said rails (1a, 1b);
   (d) activating a measurement apparatus the moment the wheel has entered said measurement axis by a defined segment and emitting a signal when the wheel leaves to define a time range; and
   (e) extending the active time of said measurement apparatus by a time factor N after the wheel has left the time range.

2. An apparatus for contactlessly measuring the brake temperature of passing railroad cars comprising an objective followed by an infrared sensor feeding infrared rays emitted from a brake or wheel to said infrared sensor along a measurement axis defined by said sensor and said objective wherein:
   (a) means for directing said measurement axis (7) toward passing wheels (3a, 3b) of said cars so that it is incident on a wheel flange (3a) at a height (H) from 1 to 5 cm above the top of the rails on which said wheels ride;
   (b) means for subtending said measurement axis (7) a height angle alpha of 10° to 2020 with a plane of two upper edges of said rails;
   (c) means for subtending said measurement axis (7) a side angle omega of 7° to 18° with a line perpendicularly intersecting both rails (1a, 1b);
   (d) track switch means activating a measurement apparatus the moment the wheel has entered the measurement axis by a defined segment, said means emitting a signal when the wheel leaves the range of said track switch means; and
   (e) an electronic circuit extending the active time of the measurement apparatus by a time factor N after the wheel has left the range of the track switch means.

* * * * *